Dec. 6, 1927.
C. E. ROGERS
1,652,051
PRESSURE INDICATOR AND REGULATOR
Filed Dec. 1, 1924
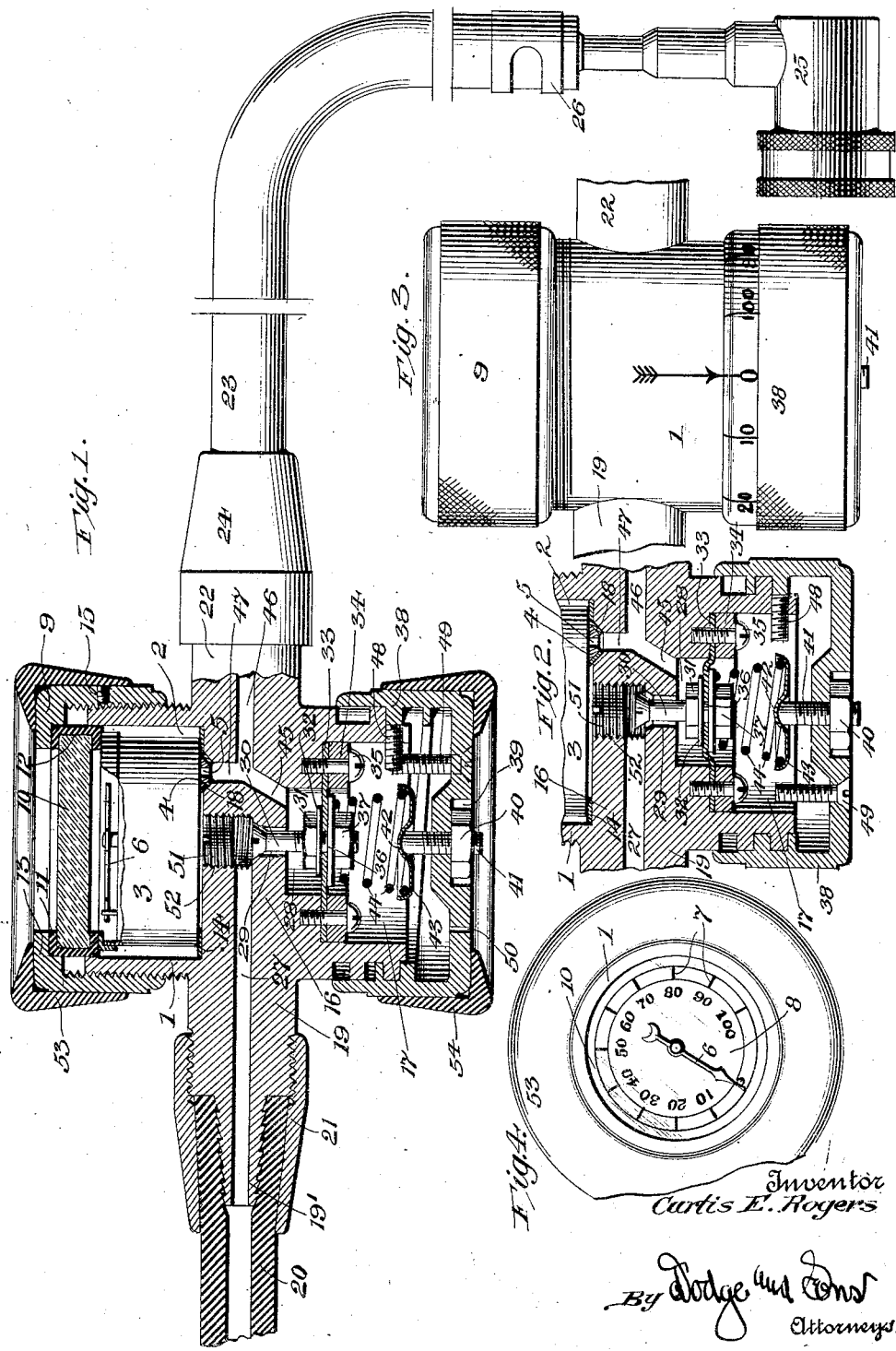
Inventor
Curtis E. Rogers
By Dodge and Sons
Attorneys.

Patented Dec. 6, 1927.

1,652,051

UNITED STATES PATENT OFFICE.

CURTIS E. ROGERS, OF LOGAN, WEST VIRGINIA.

PRESSURE INDICATOR AND REGULATOR.

Application filed December 1, 1924. Serial No. 753,304.

This invention relates to pressure indicators and regulators and has for its particular object the provision of a compact, combination pressure indicator and regulator adapted to serve as a convenient means for readily determining the pressure in a pneumatic tire, or other similar body, and for automatically regulating the amount of fluid under pressure admitted to a tire from a source of supply.

A further object of the invention is the provision of a device of this sort which is adapted to prevent improper inflation of tires, and resultant low tire mileage, due to the usual ordinary cut and try method used by most motorists and at practically all of the present day service stations. A single application of the present device is sufficient to secure the pressure desired in the tire.

Other devices of the general character of the present device have been proposed, but the main objection to the most of them is that they are unreliable and, in most cases, extremely cumbersome, due to the many parts used and their more or less complex operation. It is the purpose of the present device to provide an extremely simple, combined pressure-gage and pressure-regulator, in which a minimum number of parts are used, the operations of which are comparatively simple, and which are ruggedly designed to withstand the abuse to which such devices are usually subjected.

A most particular object of the invention is the provision of a small, but sturdy, device primarily intended to be interposed in an air supply line a short distance from the outlet end thereof, by which the operator may at all times quickly ascertain the pressure in a tire, and, by means of which, compressed-air may be admitted to a tire until any desired, predetermined pressure has been obtained, the device then automatically cutting off the air supply and indicating the pressure in the tire.

Other and further objects of the invention will appear from the following description of the detailed construction and operation of the device and the accompanying drawing, showing a practical embodiment of the invention, wherein, Fig. 1 represents a sectional view of the device applied to the usual air supply hose which is adapted to be connected at its inner end to a supply of compressed air and at its outer end is provided with the usual hose and tire-valve connector, the various parts of the device being shown in their normal, inoperative positions;

Fig. 2, a fragmentary sectional view of the device, similar to Fig. 1, with the parts in their operative positions;

Fig. 3, a side elevational view of the pressure gage and regulator proper, with the regulator controller set at "zero", or in the position which it assumes when the various parts are in their normal, inoperative positions of Fig. 1; and Fig. 4, a fragmentary plan view of the device showing the pressure gage the hand of which is at "zero", corresponding to the positions of the parts in Figs. 1 and 3.

In the drawing, the device is shown as comprising a cylindrical casing 1, preferably made of aluminum, the upper portion of which has an annular chamber 2 to receive an air pressure gage 3. This gage is preferably of the Bourdon type, but the use of any satisfactory gage is contemplated. On its lower face gage 3 is provided with a frusto-conical projection 4 having an opening 5 therethrough through which compressed-air may pass into the gage and set the mechanism thereof into operation, thereby actuating the hand 6. Hand 6 cooperates with the graduations 7 on the face 8 of the gage to give a reading of the air-pressure to which the gage is subjected.

In order to hold gage 3 firmly in position in its chamber 2, there is provided a screw cap 9 which engages with corresponding threads on the exterior surface of casing 1. Disposed in the upper end of chamber 2 is a thick, annular glass 10. Glass 10 is protected about its periphery by a gasket 11, of suitable material, provided on its inner face with an annular groove 12 into which the edge of glass 10 extends, so that the gasket fits snugly on the glass. The lower face of gasket 11 rests on the upper face of the gage 3, while screw cap 9 is provided with an annular, inwardly projecting flange 13 which engages with the upper face of gasket 11 when the parts are in place. Interposed between the bottom of gage 3 and the bottom of chamber 2 is an annular gasket 14. Thus, it will be seen that, when cap 9 is screwed down, flange 13 thereof will serve to firmly clamp glass 10 and gage 3 in place, so that, even though the device be handled roughly, there is small likelihood of these parts being broken or jarred out of place. A set screw 15 is provided to lock screw cap 9 in place when the proper adjustment of the parts has been secured.

Casing 1, which is preferably formed as a single casting, is provided with a transverse partition wall 16, which divides the casing into the gage chamber 2 and a chamber 17 which receives certain of the parts of the pressure regulator or automatic cut-off mechanism.

As shown in Fig. 1, the upper face of partition 16 is provided with a frusto-conical recess into which extends the projection 4 on the lower face of gage 3. Interposed between this projection and recess is a suitable gasket 18, which serves to prevent leakage of compressed-air between the parts and also to cushion the parts with reference to each other.

On one side thereof casing 1 is provided with a tubular extension 19, the outer end of which has a reduced and tapered, exteriorly-serrated, part 19' on which is secured the outer end of an air hose 20, extending from a supply of air-pressure (not shown). The end of hose 20 is secured firmly on extension 19, so as to preclude all possibility of leakage, by means of a sleeve 21, which at one end is provided with interior screw threads to engage with corresponding threads on extension 19. The outer end of sleeve 21 is interiorly tapered, so that, as the sleeve is screwed into place on extension 19, it serves to clamp the extremity of hose 20 firmly between it and the serrated portion 19' of extension 19.

On the opposite side of casing 1, there is provided a similar extension 22 of the casing 1 to which a short section of air hose 23 is attached in a like manner by means of a sleeve 24. The outer end of the short section of air hose 23 is provided with the ordinary type of air-hose and tire-valve connector 25 to which hose section 23 is attached firmly by means of a clamp 26. Connector 25 contains the usual check valve (not shown), which, as will readily be understood, permits the egress of compressed-air from the connector when the latter is secured in place on a tire valve, but at all other times prevents the egress of air from the hose.

Extending through extension 19 and partition wall 16 of casing 1 is a passageway 27, the outer end of which leads into hose 20 and the inner end into an annular recess 28 in the lower face of partition 16, through a passageway 29 also in partition wall 16. The upper end of passageway 29, where it joins passageway 27 is formed to provide a seat for a valve 30, the head of which is notched and whose stem is disposed in passageway 29 and projects downwardly into the recess 28 in partition 16. The lower portion of the stem of valve 30 is screw-threaded to receive a nut 31 beneath, which is located a washer 32.

Located in the upper end of chamber 17 is a diaphragm 33, which may be made of any suitable material. Diaphragm 33 is secured in place in chamber 17 about its periphery by means of a flat ring 34, the ring and diaphragm being perforated to receive screws 35, which engage in partition wall 16 to secure the parts in place.

Diaphragm 33 is perforated at its center so that the stem of valve 30 may extend therethrough. On the portion of the stem of valve 30 which projects through diaphragm 33, there is placed a washer 36 and a nut 37. When these parts are properly secured in place, the diaphragm is firmly clamped between washers 32 and 36, and when the head of valve 30 is on its seat, the diaphragm is flat, as shown in Fig. 1.

The open end of chamber 17 is closed by means of a screw cap 38, which is provided interiorly with quick-pitch, screw-threads which cooperate with corresponding screw-threads on the exterior of casing 1, so as to secure screw cap 38 in place and provide for quick inward and outward longitudinal movement thereof when the cap is rotated.

Located centrally of the top of screw cap 38 is a depression 39 in which is located a nut 40. Extending through a suitable threaded opening in the top of screw cap 38 and through nut 40 is a screw-threaded pin 41, the inner end of which is rounded and engages with a similar depression 42 in a cap 43 disposed centrally in chamber 17. Cap 43 supports and retains the lower, larger end of a frusto-conical, coil-spring 44, the upper, smaller end of which encompasses nut 37 and bears against washer 36.

The recess 28 in partition wall 16, which is in fact an extension of chamber 17, is connected at its inner end, by means of a passageway 45, to a passageway 46 which extends through extension 22 of casing 1 and connects with the short section of hose 23. A passageway 47, in partition wall 16, also serves to connect passageways 45 and 46 with the opening 5 in the bottom of gage 3.

From the detailed description of the construction of the device given above, it will be seen that, with the various parts in their normal inoperative positions (Fig. 1), valve 30 is closed and compressed-air entering passageway 27 from hose 20 cannot pass beyond the valve. At this time, as hereinafter explained, the device may be used as an ordinary gage for determining the pressure in a tire. Casing 1 is provided exteriorly, as shown in Fig. 3, with an arrow or similar mark, and the skirt of screw cap 38 is provided with certain graduations indicating different pressures in pounds per square inch. The device is designed and constructed so that when the "zero" mark on screw cap 38 is opposite the arrow on casing 1, the various parts connecting screw cap 38 to diaphragm 33 are in such relative positions that diaphragm 33 is in its normal position, that is, the position of Fig. 1, in which the diaphragm is not flexed and valve 30 is closed.

When screw cap 38 is rotated clockwise, through the various parts hereinbefore described, the diaphragm 33 is flexed upwardly to open valve 30 more or less according to the amount of rotation of screw cap 38. Screw cap 30, having been partially rotated in a clockwise direction, and valve 30 partially opened by this movement, when air pressure enters passageway 27, it will pass therefrom into passageway 29, thence into recess 28, from which it passes onward to the gage 3 through passageway 47 and to the tire valve connector 25 through hose section 23. During its passage through these parts, the compressed air will act on gage 3 and indicate the pressure in the several passageways directly connected thereto by means of passageway 47. At the same time the air pressure will act on the upper side of diaphragm 33, and as soon as the pressure in recess 28 becomes sufficient to overcome the resistance of spring 44, it will move the diaphragm 33 from its flexed position of Fig. 2 to its normal flat position of Fig. 1 and close valve 30, thereby preventing the entrance of further air under pressure through hose 20 from the source of supply.

The device is calibrated and the upper, outer surface of screw cap 38 provided with graduations, corresponding to those on the face of pressure gage 3, to cooperate with the arrow on casing 1 (see Fig. 3), so that, when screw cap 38 is rotated clockwise to bring a graduation, say the graduation "20," opposite the arrow, spring 44 will be compressed which will result in diaphragm 33 being moved to the flexed position of Fig. 2. This causes valve 30 to open, thereby permitting air under pressure from the source of supply to pass through recess 28 and on into the pneumatic tire through connector 25. As the pressure in the tire builds up, should it be below twenty pounds per square inch, the fluid-pressure will also build up in the hose section 23 and on backward into the device until the air-pressure reaches twenty pounds per square inch in the recess 28. Since screw cap 38 has been set for a pressure of twenty pounds per square inch, immediately the pressure in recess 28 reaches this, the pressure will act on diaphragm 33 to return it to the normal position of Fig. 1, thereby closing valve 30 and preventing further entrance of air into the tire. The surface of valve 30 which is subjected to air-pressure passing through passageway 27 tending to seat the valve, is made of a lesser area than the upper surface of diaphragm 33 which is subjected to air-pressure, so that the valve cannot be closed by air-pressure acting thereon but must be closed by air-pressure acting on the upper surface of diaphragm 33 to close valve 30 against the resistance of spring 44.

At the same time that the air under pressure passes through the device to the tire, it also passes into gage 3 through passageway 47, thereby operating the gage which, by means of hand 6, indicates at all times the pressure which exists in passageway 47 and the other passageways with which this passageway is connected. It will therefore be seen that, when the air-pressure from the source of supply has reached the predetermined pressure so as to close valve 30, the gage 3 will indicate the pressure in the tire, which of course corresponds to the pressure graduation to which screw cap 38 has been adjusted, that is, twenty pounds per square inch, in the present case.

Of course when the device is calibrated, any desired graduations placed thereon, but graduations running from "0" to "100" have been shown thereon for purposes of illustration.

Screw-cap 38 may be rotated to bring any desired graduation thereon opposite the arrow on casing 1, the graduation selected corresponding to the pressure which it is desired to have in the tire. The connector 25 is then placed on the tire valve, thereby opening the check valve in the connector and permitting the air under pressure to enter the tire and inflate it to the desired, predetermined pressure. When this pressure is reached in the tire, the regulator or cut-off means, as heretofore explained, will automatically shut off the air-pressure from the source of supply and the gage will indicate the pressure which has been attained in the tire. It will thus be seen that the air gage 3, at all times, serves as a check on the accuracy of the pressure regulator mechanism. In case the regulator mechanism is set for a predetermined pressure, and after the pressure supply has been automatically cut off, but it is found that the reading on the gage 3 does not correspond to the predetermined pressure at which the screw cap 38 has been set, it will be obvious that the pressure-regulating part of the device has become inaccurate. This will occur, if at all, only after long usage of the device and will probably be due to loss of strength of spring 44 or wear on the threads of cap 38 and casing 1. This may readily be remedied by recalibrating the device by means of the screw 41 and its lock nut 40 in the center of screw cap 38. Lock nut 40 can be backed off and screw 41 screwed in sufficiently to offset the loss of strength of spring 44. The accuracy of the pressure regulator mechanism, as thus adjusted, can then be checked by using the device in the usual way to determine if the reading of gage 3 corresponds with the setting of screw cap 38 after the air-pressure has been automatically cut off. After the device has been properly adjusted, screw 41 can be locked in place by means of its nut 40 and the device will then operate in accordance with the original calibrations.

As stated before, the device is intended to be used to ascertain the pressure already in a tire before admitting air under pressure thereto. This is accomplished by simply setting screw cap 38 at "0" and attaching the connector 25 to the tire valve. Since with screw cap 38 so set, valve 30 is closed, air under pressure from the tire will act on gage 3 and the pressure in the tire can be read therefrom. Valve 30, at this time, cannot open because of the pressure acting on the upper surface of diaphragm 33. If it is found that the tire contains insufficient pressure, the device may then be used, as heretofore explained, to increase the air pressure to a predetermined point.

In order to prevent accidental removal of screw cap 38 from casing 1 and to limit its rotative movement in both directions, casing 1 is provided with a screw-threaded, stop-pin 48 secured in an opening through the side wall of chamber 17 and projecting into said chamber. Stop-pin 48 is adapted to be engaged by a screw 49 secured in screw-cap 38 and also projecting into chamber 17. When screw-cap 38 is rotated, stop-screw 49 engages with stop-screw 48 to prevent the graduation "0" on cap 38 from moving beyond the arrow on casing 1, when the cap is moved in one direction, and from being turned more than one complete revolution in the opposite direction. Screw-cap 38 is also provided with a small opening 50 therein to insure the presence of atmospheric pressure on the lower side of diaphragm 33, this being necessary for proper operation of the device, as will be readily understood.

If it is desired to entirely remove screw-cap 38 for any purpose, this may be done by unscrewing stop 49 so that it does not strike stop 48 as the cap is rotated. The cap may then be screwed off of casing 1. In case it should be necessary to gain access to valve 30, this may be done by simply removing screw-cap 9, gage 3 and the other associated parts, after which a screw plug 51, located in a suitable screw-threaded opening 52, leading into the inner end of passageway 27, may be removed. Valve 30 is then accessible and, since its upper end is slotted, a screw-driver may be inserted and the valve rotated for the purpose of disassembling the various parts of the cut-off mechanism.

In order to further protect it from the rough usage to which devices of this sort are usually subjected, the device, on screw-cap 9 and screw-cap 38, is provided with annular, rubber collars 53 and 54, respectively, these not being shown in Figs. 2 and 3 for sake of clearness. Each of these collars is approximately L-shaped in cross-section and fits snugly on its cap by reason of its elasticity, or, it may be otherwise secured on the screw-cap so as to protect the edges thereof from damage and cushion the device from any shocks to which it is subjected when thrown around and otherwise roughly handled. Preferably the collars 53 and 54 are considerably thickened at the juncture of the legs of their L-shaped cross-section, so as to provide a very efficient shock-absorbing means.

From the foregoing description, it will be found that the present invention provides an extremely useful and efficient device, which can easily be interposed in the air hose of any compressed-air apparatus. Because of its relatively small size and light weight, it does not hinder, in the least, the ordinary use of the air hose and its connector, but does provide means, in the immediate vicinity of the operator who is applying air-pressure to the tire, for indicating the pressure in the tire and for accurately and automatically controlling the admission of air thereto.

Although changes may be made in the device, the present embodiment thereof has proved quite practicable from numerous standpoints. Of these, there might be mentioned particularly, compactness and convenience, due, to a great extent, to the form of the casing and the arrangement of the pressure indicating and regulating means and their chambers in alinement, so that they have a substantially common longitudinal axis.

What I claim is:

1. In a combined gage and pressure regulator, the combination of a casing having a chamber adapted to enclose a gage unit and formed with inlet and discharge connections and with a passage connecting the same and leading to said chamber; an adjustable pressure reducing valve in said casing controlling said passage between the inlet and the outlet connections; a member movable on said casing and operatively connected with said pressure reducing valve to adjust the same; a complete self-sustained gage unit having a connection port on one face thereof, removably mounted in said chamber with its port in registry with the passage in said casing; sealing means for the joint between the gage and casing around said registering port and passage; and a retaining ring threaded on the casing and clamping said gage unit in the chamber, so as to render said joint fluid tight.

2. In a combined gage and pressure regulator, the combination of a casing having a chamber adapted to enclose a gage unit and formed with inlet and discharge connections and a passage connecting the same and leading to said chamber; a pressure reducing valve mounted in said casing and including a diaphragm subject to the pressure in said passage, and a spring action in opposition to said pressure on said diaphragm, said reducing valve controlling said passage between the inlet and the outlet connections; a cap threaded on said casing and serving as an abutment for said spring, the parts being so arranged that the stress on the spring is adjusted by the threaded cap; a complete self-sustaining gage unit having a connection port, removably mounted in said chamber with its connection port in registry with said passage; sealing means for the joint between the gage and casing around the registering port and passage; a retaining ring threaded on said casing and clamping said gage unit in said chamber, so as to render said joint fluid tight; and gaskets between the ends of the gage unit, the casing and the retaining ring.

In testimony whereof I have signed my name to this specification.

CURTIS E. ROGERS.